Nov. 9, 1965     E. P. D'AZZO     3,216,433
LOADING DOCK SHELTER

Filed June 11, 1964     2 Sheets-Sheet 1

INVENTOR.
ERROL P. D'AZZO
BY J. B. Burke
ATTORNEY

Nov. 9, 1965 E. P. D'AZZO 3,216,433
LOADING DOCK SHELTER
Filed June 11, 1964 2 Sheets-Sheet 2

INVENTOR.
ERROL P. D'AZZO
BY J. B. Burke
ATTORNEY

United States Patent Office 3,216,433
Patented Nov. 9, 1965

3,216,433
LOADING DOCK SHELTER
Errol P. D'Azzo, 528 Park Ave., Brooklyn, N.Y.
Filed June 11, 1964, Ser. No. 374,318
14 Claims. (Cl. 135—5)

This invention relates to loading dock shelters of the kind adapted to be mounted between a warehouse doorway and a truck, railway car or other hauling means, for protecting the warehousemen as well as the articles of merchandise being loaded in or unloaded from the truck through the warehouse doorway.

It is one object of the invention to provide an improved framework for such a dock shelter which will automatically extend the shelter and hold it extended from the warehouse doorway.

It is another object to provide a dock shelter with a framework having parts which are mounted for swinging laterally and for retracting so that the dock shelter is not damaged when a truck backing up to the doorway encounters the framework if the truck is not properly aligned with the doorway.

Still another object is to provide a framework for a dock shelter as described, with means for automatically returning deflected framework parts to upright, forwardly extending positions when deflecting forces are released.

A further object is to provide a dock shelter with an improved framework which can be retracted by pulling a single looped cord or rope.

Still another object is to provide a dock shelter with spring loaded arm assemblies on both sides of the framework, the arm assemblies being mounted on axially vertical spring biased hinges for swinging laterally against spring tension, and having axially horizontal pivots for extension and retraction of the arm assemblies in vertical planes.

Further objects are to provide a dock shelter construction: which is quickly and easily installed at a doorway of a warehouse by relatively unskilled workmen; which is rugged in construction; which is positive and foolproof in operation; which is relatively inexpensive to manufacture; which effectively protects and covers the warehouse doorway and space between the doorway and truck at the doorway; and which provides long, trouble-free, satisfactory service in uses for which it is intended.

The invention will be best understood from the following detailed description taken together with the drawing, wherein.

Figure 1:
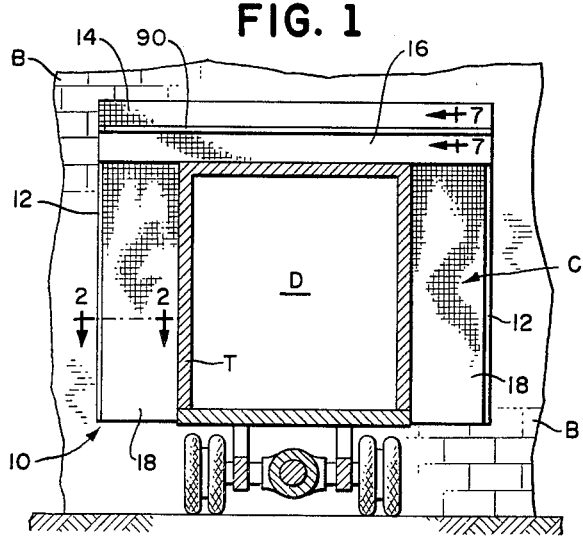
FIG. 1 is a reduced front elevational view of a dock shelter embodying the invention, with a truck shown in cross section standing in the shelter.

Referring first to FIGS. 1–6, there is shown a dock shelter 10 installed at doorway D of a warehouse building B. The dock shelter has a fabric cover C including vertical side panels 12, slanted roof panel 14, vertical front valance 16 and vertical, narrow front panels 18. The front panels and valance define an opening into which a truck body T can enter. Inner marginal portions of the front panels and valance will contact and form seals with the top and sides of the truck. The top panel 14 extends over the space between the top of the truck and the doorway; and the side panels extend alongside the sides of the truck but spaced therefrom by the widths of the front panels. To the extent described the dock shelter is substantially conventional.

According to the invention, the dock shelter is provided with a framework 20 shown to best advantage in FIGS. 2–6. This framework has an upper horizontal cross bar, rod or tube 22 supported at its opposite ends by a pair of spring and gravity actuated tubular arms 24a, 24b. The upper and outer ends of arms 24a, 24b are rigidly secured to the ends of the tube 22. A pair of brace bars 25a, 25b are pivotally secured at lower outer ends thereof to substantially central points P1, P1' on arms 24a, 24b. Upper and inner ends of the brace bars are pivotally attached to brackets 26 secured to doorway panels 28a, 28b near upper ends thereof. A first pair of tensioned springs 29 is secured between an intermediate point P2 on bar 25a and an intermediate point P3 on arm 24a below point P1 on arm 24a. Another pair of tensioned springs 29' is secured at its upper end to intermediate point P2' on bar 25b corresponding to point P2 on bar 25a, and is secured at its lower end to point P3' on arm 24b below point P1' corresponding to point P1 on arm 24a. Lower and inner ends of arms 24a, 24b are pivotally attached to couplings 30 slidably mounted on vertical guide rods 33 attached to doorway panels 28a, 28b and standing off therefrom by means of brackets 34 at upper and lower ends of the guide rods. The guide rods are located near lower ends of the doorway panels.

The framework includes two lower arm assemblies 40a, 40b on opposite sides. Each arm assembly has a pair of outer bars 42a, 44a pivotally attached to each other by joint 43 at their upper ends in an inverted V-shaped configuration. The lower rear end of the rear bar 44a is pivotally secured by rivet 46a or pivot bolt to a swingable hinge plate 45a; see FIGS. 2, 3, 5, 9. Fixed hinge plate 48a is secured to a vertical plate 47 on the door panel 28a or 28b below guide rod 33. Hinge plates 45a, 48a are normally held 90° to each other, with plate 45a extending forwardly, by a tensioned coil spring 49a on pin 51a engaged in eyes 56a, 57a of the hinge plates. Opposite ends 49' of the spring 49a are engaged in struck out loops 57a on the respective hinge plates.

A pair of springs 50a are secured at their upper ends to intermediate points P4 on bars 44a. The lower ends of the springs are connected to screw eyes 52 held by nuts 53 at the underside of horizontal mounting plate 54. The plate 54 is integral with a vertical plate 47 which is secured to the lower end of the doorway panel. The springs are tensioned so that they tend to draw rear bar 44a downwardly while front bar 42a is free to extend outwardly. Adjacent to outer bars 42a, 44a is another pivotally attached inner pair of bars 42b, 44b arranged like bars 42a, 44a. The lower end of rear bar 44b is pivotally secured by a rivet or pivot bolt 46b to swingable hinge plate 45b parallel to plate 45a. Plate 56b is engaged by pin 51b with fixed hinge plate 48b on vertical mounting plate 47. A tensioned spring 49b on pin 51b holds plate 45b at right angles to plate 48b. Spring ends 49'' are engaged in struck out loops 57b.

Springs 50b are connected to intermediate points P4' on rear bar 44b and to screw eyes 52 held by nuts 53 on horizontal plate 54. A bolt 60 extends through hole 59 in outer bar 42a and is secured by nuts 61 at eyelet 62 in side panel 12 at each side of the dock shelter. A fabric loop 63 is engaged in bolt 60. This loop is secured to the bottom of front panel 18; see FIGS. 2, 4. Another bolt 64 passes through hole 59' in each inner bar 42b. Fabric loops 65 secured to panel 18 are engaged on bolt 64 at opposite sides of bar 42b. Washers 66 at opposite ends of bolt 64 abut the loop 65. A nut 67 on bolt 64 holds the bolt, washers and loops together. By the arrangement described, the two pairs of bars 42a, 44a and 42b, 44b in each arm assembly constitute two extensible and retractable arms located side-by-side. The arms can be swung laterally from side to side with the swingable hinge plates as indicated by dotted lines in FIG. 2. Since the arms 42a, 42b are not connected to each other, each of these arms at each side of the shelter can move independently of the other if struck by the truck while backing up or maneuvering into place in the dock shelter. The springs 49a, 49b on the hinge plates will tend to restore the arms to forwardly extending positions if they are deflected laterally.

Figure 2:
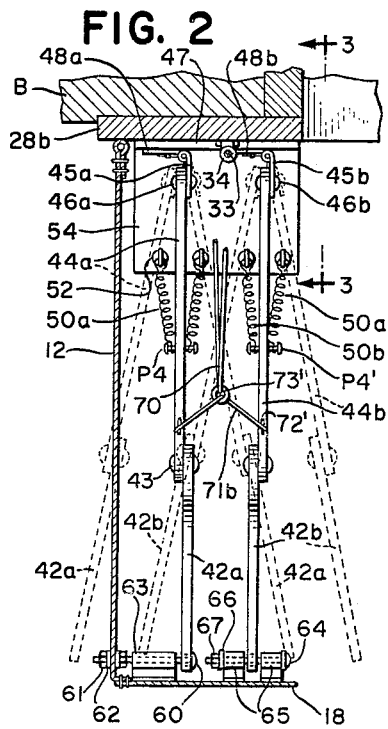
FIG. 2 is an enlarged fragmentary sectional view taken on line 2—2 of FIG. 1.
Figure 3:
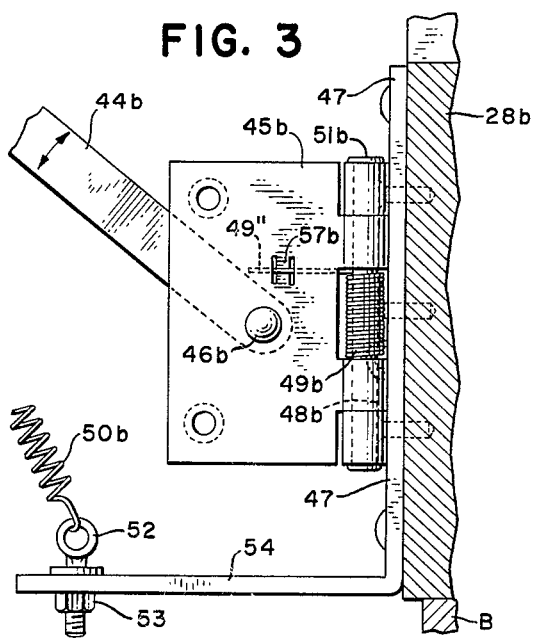
FIG. 3 is a further enlarged fragmentary sectional view taken on line 3—3 of FIG. 2.
Figure 5:
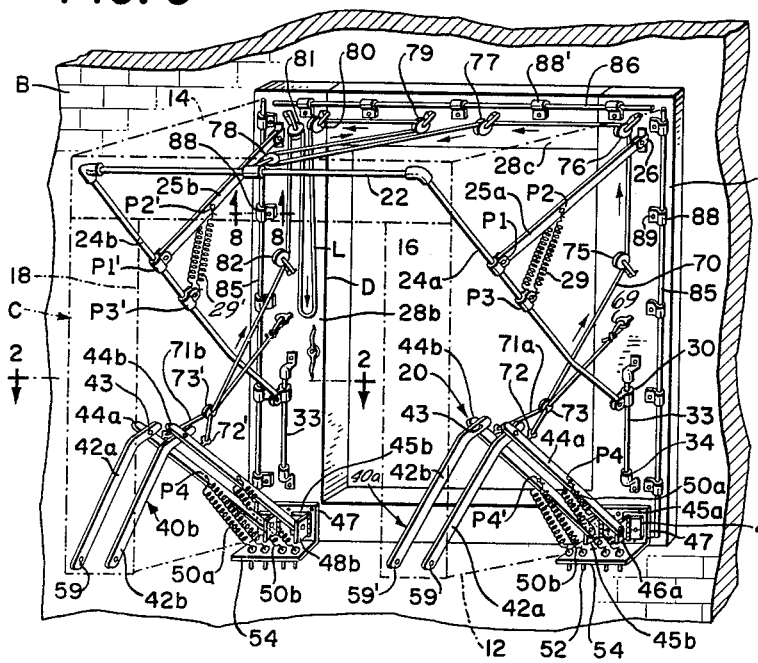
FIG. 5 is a perspective view of the framework of the dock shelter in extended position shown mounted at a warehouse doorway, the cover of the shelter being removed.

The framework is shown in an extended position in FIGS. 2 and 5. The framework is in a stable condition and is held extended by lower springs 50a, 50b and by upper springs 29, 29'. The upper springs project the arms 24a, 24b forwardly while the lower springs project the bars 44a, 44b forwardly. The entire framework 20 can be retracted by pulling downward on loop L of a rope 70. This rope has opposite ends tied to screw eyes 69 at mid-points of panels 28a, 28b. Rings 73, 73' are held on cross loops 71a, 71b secured to hooks 72 near upper ends of bars 44a, 44b. From the right screw eye as viewed in FIG. 5, the rope 70 passes through the right ring 73. Then the rope is entrained under and behind a first pulley 75 on doorway panel 28a, then upwardly to a second pulley 76 at the top of panel 28a, across to a third pulley 77 on horizontal doorway panel 28c and around a fourth pulley 78 secured to the center of tube 22. From pulley 78 the rope continues rearwardly to a fifth pulley 79 near pulley 77 on panel 28c, then laterally to sixth pulley 80 on the top doorway panel 28c, down to form loop L and up to a seventh pulley 81 adjacent to pulley 80 on panel 28c. From pulley 81 the rope continues down to eighth pulley 82 on a doorway panel 28b and around behind this pulley to left ring 72' on V-branch 71b; then through this ring to the left screw eye on panel 28b. The arrows adjacent the rope 70 in FIG. 5 indicate that when the loop L is pulled down, the entire framework will be retracted to the position of FIG. 6 with arms 24a, 24b substantially vertical and bars 44a, 44b drawn back. The bars 42a, 42b hang vertically due to their weight. The free looped portion L of the rope should be tied to cleat 84 on panel 28b to keep the entire dock shelter retracted. The cover C is retracted along with the framework of the dock shelter. If the rope is untied from the cleat 84, the dock shelter will extend forward automatically as the springs partially relax in tension to the position of FIGS. 1, 2 and 5.

Figure 4:
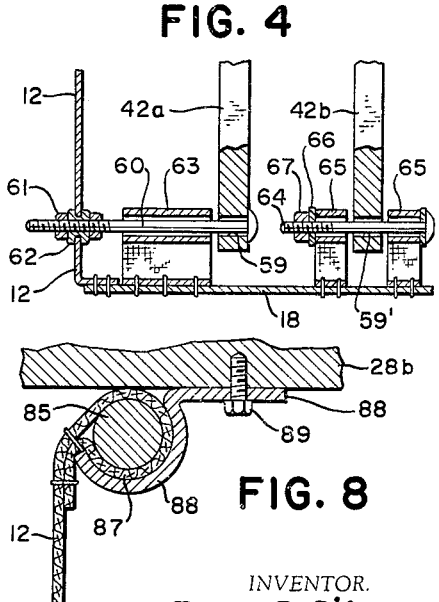
FIG. 4 is a further enlarged view partially in section of a portion of FIG. 2.
Figure 7:
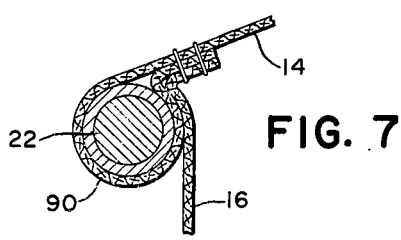
FIG. 7 is an enlarged fragmentary sectional view taken on line 7—7 of FIG. 1.
Figure 8:
FIG. 8 is a sectional view similar to FIG. 7 taken through an end of the dock shelter.

In order to attach the cover C to the framework of shelter and to the doorway, rods 85, 86 may be provided. Rods 85 may be inserted through loops 87 at rear ends of the side panels as illustrated in FIG. 8 and the enclosed rods may be engaged by clamp brackets 88 held by bolts 89 on panels 28a, 28b. Rod 86 may be secured in a similar loop at the rear end of the top roof panel 14 of the cover, and the enclosed rod will be held by clamp brackets 88' on top panel 28c. Tube 22 will be enclosed in a loop 90 at the forward end of top panel 14 as shown in FIG. 7. Bolts 60 and 61 are engaged by loops 63, 65 at the bottom of the front panels 18 as indicated in FIGS. 2 and 4. Thus the entire cover is held securely on the framework and doorway panels.

Figure 6:
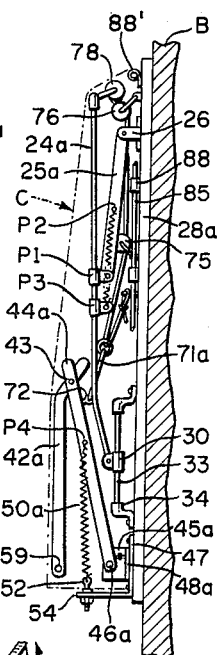
FIG. 6 is a side view of the framework in a retracted position.
Figure 9:
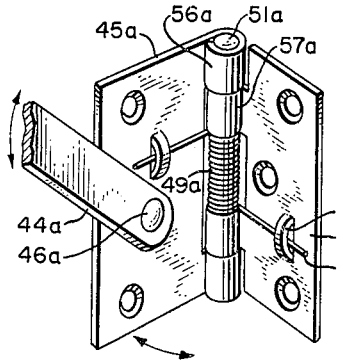
FIG. 9 is a front perspective view of a hinge plate assembly.

When the framework retracts front bars 42a, 42b assume vertical positions as shown in FIG. 6 just behind the retracted front panels 18. When the framework expands or extends upon release of rope 70, the entire cover expands with it.

It will be noted that the truck body T contacts and seals with the free bottom of valance 16 and the inner edge portions of front panels 18 and is clear of the arm assemblies 40a, 40b which are behind the front panels. The tube 22 will be normally disposed above the top of the truck body. The lower arm assemblies may be struck by the truck body as the truck backs in at an angle or out of alignment with the doorway opening. This will not harm the dock shelter since the arm assemblies 40a, 40b will retract and/or swing laterally on the hinges at the door panels 28a, 28b. When the truck pulls forwardly away from the dock shelter to align properly with the doorway the dock shelter will straighten itself. When the arm assemblies 40a, 40b are laterally deflected, one spring in each pair of springs 50a and one spring in each pair of springs 50b will be expanded while the other springs in the pairs will be contracted. In addition the springs 49a, 49b will be tensioned at the hinge plates. When the arm assemblies are released by the truck's pulling forwardly, the expanded springs 50a, 50b will contract while the other springs expand and the springs 49a, 49b relax, to align the arm assemblies 40a, 40b into vertical planes as shown in FIGS. 2 and 5. This automatic aligning feature insures that the dock shelter is not damaged when a truck backs into it, and the shelter is restored to upright extended position thereafter. It will be noted that the springs 49a 49b on the hinge plates cooperate with springs 50a, 50b in restoring the deflected arms to forwardly extended position.

Figure 10:
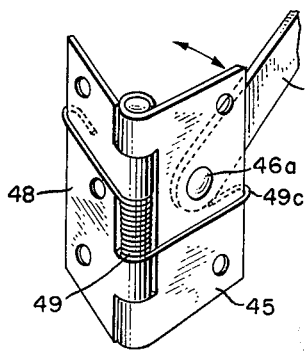
FIG. 10 is a rear perspective view of another hinge plate assembly.

FIG. 10 shows an alternative arrangement of the springs on the hinge plates. Spring 49 is mounted on pin 51 connecting hinge plates 45 and 48. The ends of the tensioned spring are formed into hooks 49c which are engaged on and around the outer free edges of the hinge plates. The spring 49 keeps plate 45 extending perpendicularly to plate 48 but will permit plate 45 to be deflected laterally with arm 44a or 44b. When the deflected arm is released the spring 49 will restore the plate 45 and arm 44a or 44b to forwardly extending position perpendicular to plate 48. Springs 49a, 49b shown in FIGS. 3 and 9 operate in the same manner but require struck out loops 57a, 57b in the hinge plates. These loops are not required in the hinge plates 45, 48 of FIG. 10.

Figure 11:
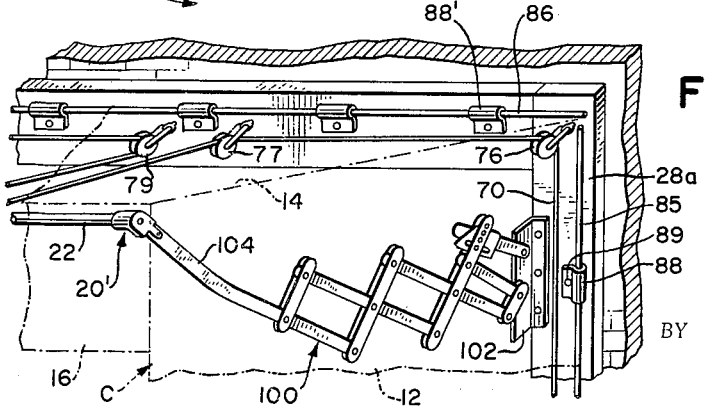
FIG. 11 is a perspective view of part of another framework for a dock shelter.

In FIG. 11, the framework 20' is similar to that of framework 20 and corresponding parts are identically numbered. Instead of the spring loaded upper side arms 24a, 24b and 25a, 25b, there is provided a pair of scissor arm assemblies or lazy tong assemblies 100 each secured at its rear end to a bracket 102 mounted on the side panels 28a or 28b. The scissor arm assemblies include longer upwardly extending forward links which support the cross bar 22. The scissor arm assemblies are retracted by pulling the rope 70 arranged in the same manner as explained above with an intermediate loop and pulley. Normally the scissor arm assemblies will open automatically to extended position and remain extended as shown in FIG. 11, due to the weight of the cross bar 22 and the cover C carried by the framework. Also the spring loaded lower arms or bars will assist in extending the framework including the cover C and the scissor arms. Only one scissor arm assembly is shown in FIG. 11 at one side of the framework. The other arm assembly, not shown, is identical in structure.

The spring loaded laterally swingable arm assemblies 42a, 44a and 42b, 44b will be provided with the two scissor arm assemblies in the same manner as illustrated in connection with FIGS. 1–9.

Although double arm assemblies 42a, 44a and 42a, 44b have been shown at each side of the framework 20, it will be understood that it is possible to omit one pair of arms 42b, 44b and use only arms 42a, 44a at each side of the framework 20 or 20'. However for a heavy duty installation, two pairs of lower arm assemblies at each side of the framework are preferred.

Although various embodiments and modifications of the invention have been described, the invention is not limited thereto. It is intended that the invention be construed as coextensive with the broadest of the appended claims.

What is claimed and desired to protect by Letters Patent of the United States is:

1. In a shelter for a doorway of a warehouse, a framework comprising an arm assembly including a first front bar and a first rear bar pivotally joined to each other in an inverted V-shaped configuration and disposed in a first vertical plane, a second front bar and a second rear bar pivotally joined to each other in an inverted V-shaped configuration in a second vertical plane close to the first vertical plane, a mounting structure including integrally joined vertical and horizontal mounting plates, a pair of hinges on the vertical mounting plate, said hinges having hinge plates swingable on vertical axes, lower ends of the rear bars being pivotally attached to different ones of the hinge plates so that the rear bars are pivotable in vertical planes and swingable around the vertical axes of the hinges, a first pair of springs adjustable in tension connected between an intermediate point of the first rear bar and the horizontal mounting plate, a second pair of springs adjustable in tension connected between an intermediate point of the second rear bar and the horizontal mounting plate, so that the two pair of springs tend to extend the rear bars forwardly from the mounting plates with the front bars extending downwardly from the joints with the rear bars, said front bars having free ends for attaching a shelter cover thereto, whereby said arm assembly can be deflected laterally from side to side under tension in said springs and can be retracted toward the mounting plates and extended therefrom under tension in said springs.

2. In a shelter for a doorway of a warehouse, a framework comprising two arm assemblies mountable respectively at opposite sides of the doorway, each arm assembly including a front bar and a rear bar pivotally joined to each other in an inverted V-shaped configuration, hinge means for mounting each arm assembly in a vertical plane, each arm assembly being laterally deflectable on said hinge means, first spring means on said hinge means biasing each arm assembly into said vertical plane, and second spring means connected between the rear bar of each arm assembly and the hinge means, said second spring means extending the front and rear bars forwardly in said vertical plane, said first and second spring means cooperating with each other in resisting lateral deflection of each arm assembly and in restoring each arm assembly to its vertical plane after lateral deflection therefrom, said second spring means serving to restore the front and rear bars in each arm assembly to forwardly extending position in the event that either arm assembly is retracted rearwardly and is then released.

3. In a shelter for a dock doorway, a framework including a pair of upper extensible and retractable arm assemblies for mounting at opposite sides of said doorway, a cross member connected to opposite ends of the arm assemblies, means normally holding the arm assemblies in forwardly extending positions, a pair of lower extensible and retractable arm assemblies for mounting at opposite sides of the doorway below the upper arm assemblies, said lower arm assemblies including hinge mountings so that the lower arm assemblies are movable laterally, first spring means on said hinge mountings normally biasing the lower arm assemblies into vertical planes, and second spring means on said hinge mountings and connected to the lower arm assemblies to bias the lower arm assemblies to forwardly extending positions in said vertical planes.

4. In a shelter according to claim 3, a rope and pulley assembly connected to said cross member and to the lower arm assemblies so that the upper and lower arm assemblies are retracted simultaneously when the rope is pulled, and whereby the lower and upper arm assemblies automatically extend themselves forwardly when the rope is released.

5. In a shelter for a dock doorway having spaced side panels and a top panel, a framework comprising top and bottom frame structures, said top structure including a pair of frame arms, a pair of brace bars pivotally connected at one end thereof to points intermediate between the ends of the frame bars respectively, a pair of brackets mountable on the side panels, other ends of the brace bars being pivotally attached to the brackets for swinging the brace arms in spaced vertical planes, a horizontal cross member connected to upper, outer ends of the frame arms, a pair of vertical guide rods mountable on the side panels, lower ends of the frame arms being slidably connected to the guide rods so that the frame arms can be pivoted between vertical and inclined positions, first springs connecting each frame arm with a brace bar for holding the frame arms in outwardly inclined positions in said vertical planes while the brace bars are outwardly and downwardly inclined with respect to the brackets and guide rods; said bottom frame structure including two arm assemblies mountable on the respective side panels, each of the arm assemblies comprising a first front bar and a first rear bar pivotally joined to each other in an inverted V-shaped configuration and disposed in a first vertical plane, a second front bar and a second rear bar pivotally joined to each other in an inverted V-shaped configuration in a second vertical plane close to the first vertical plane, a mounting structure including a vertical plate integral with a horizontal plate and attachable to the side panels, a pair of hinges on the vertical mounting plate, said hinges having hinge plates swingable on vertical axes, lower ends of the rear bars being pivotally attached to different ones of the hinge plates so that the rear bars are pivotable in vertical planes and swingable around the vertical axes of the hinges, a first pair of other springs adjustable in tension and connected between an intermediate point of the first rear bar and the horizontal mounting plate, a second pair of other springs adjustable in tension and connected between an intermediate point of the second rear bar and the horizontal mounting plate, so that the two pairs of other springs tend to extend the rear bars forwardly from the mounting plates with the front bars extending downwardly from the joints with the rear bars, said front bars having free ends for attaching a shelter cover panel thereto, whereby the arm assemblies can be independently deflected laterally from side to side under tension in the other springs, and can be retracted toward the mounting plates and extended therefrom under tension in said other springs.

6. In a shelter according to claim 5, a fabric cover attachable to the doorway panels and engaged with the cross member and with free ends of the front bars, so that the cover retracts and expands with the top and bottom frame structures.

7. In a shelter according to claim 5, a rope for retracting the entire framework toward the doorway panels, said rope having opposite ends connected to the doorway panels and slidably engaging each pair of rear bars in the two arm assemblies respectively, a plurality of spaced pulleys mountable on the doorway panels and cross member, said rope being entrained on the pulleys and having a free loop so that upon pulling downwardly on said loop, the top and bottom frame structures retract simultaneously and upon releasing said loop the top and bottom frame structures extend automatically under tension in the first and second other springs and in the first named springs.

8. In a shelter according to claim 7, a fabric cover attachable to the doorway panels and engaged with the cross member and with the free ends of the front bars so that the cover retracts and expands with the top and bottom frame structures.

9. A shelter for a dock doorway, comprising vertical panels at opposite sides of the doorway, a top panel above the doorway; a framework including top and bottom frame structures, said top structure including a pair of frame arms, a pair of brace bars pivotally connected at one end thereof to points intermediate between ends of the frame bars respectively, a pair of brackets mounted on the side panels respectively, other ends of the brace bars being pivotally attached to the brackets for swinging the brace bars and frame arms in spaced vertical planes, a horizontal cross member connected to upper ends of the frame arms, a pair of vertical guide rods mounted near lower ends of the side panels, lower ends of the frame arms being slidably connected to the guide rods so that the frame arms can be pivoted between vertical and inclined positions, first springs connecting each frame arm with a brace bar for holding the frame arms in outwardly and upwardly inclined positions in said vertical planes while the brace bars are outwardly and downwardly inclined with respect to the brackets and guide rods; said bottom frame structure including two arm assemblies mounted on the respective side panels, each of the arm assemblies comprising a first front bar and a first rear bar pivotally joined to each other in an inverted V-shaped configuration and disposed in a first vertical plane, a second front bar and a second rear bar pivotally joined to each other in an inverted V-shaped configuration in a second vertical plane close to the first vertical plane, a mounting structure including a vertical plate attached to one of the side panels, and a horizontal mounting plate integral with the vertical plate, a pair of hinges on the vertical mounting plate, said hinges having hinge plates swingable on vertical axes, lower ends of the rear bars being pivotally attached to different ones of the hinge plates so that the rear bars are pivotable in vertical planes and swingable around the vertical axes of the hinges, a first pair of other springs adjustable in tension and connected between an intermediate point of the first rear bar and the horizontal mounting plate, a second pair of other springs adjustable in tension and connected between an intermediate point of the second rear bar and the horizontal mounting plate, so that the two pairs of other springs tend to extend the rear bars forwardly from the mounting plates with the front bars extending downwardly from the joints with the rear bars, said front bars having free ends for attaching a shelter cover panel thereto, whereby the arm assemblies can be independently deflected laterally from side to side under tension in the other springs, and can be retracted toward the mounting plates and extended therefrom under tension in said other springs.

10. In a dock shelter according to claim 9, a rope for retracting the entire framework toward the doorway panels, said rope having opposite ends connected to the doorway panels and slidably engaged with each pair of rear bars in the two arm assemblies respectively, a plurality of spaced pulleys mountable on the doorway panels and cross member, said rope being entrained on the pulleys and having a free loop so that upon pulling downwardly on said free loop, the top and bottom frame structures retract simultaneously and upon releasing said loop the top and bottom frame structures extend automatically under tension in the first named and other pairs of springs.

11. In a dock shelter according to claim 10, a fabric cover attached at rear edges thereof to the doorway panels, and attached at front edges thereof to the cross member and to free ends of the front bars, so that the cover retracts and expands with the top and bottom frame structures.

12. In a shelter for a dock doorway having side and top doorway panels, a framework including a pair of upper extensible and retractable arm assemblies for mounting at opposite sides of the doorway, a cross member connected to opposite ends of the arm assemblies, means normally holding the arm assemblies in forwardly extending positions, a pair of lower extensible and retractable arm assemblies for mounting at opposite sides of the doorway below the upper arm assemblies, said lower arm assemblies including hinge mountings so that the lower arm assemblies are movable laterally, first spring means on said hinge mounting normally biasing the lower arm asesmblies into vertical planes, and second spring means on said hinge mountings and connected to the lower arm assemblies to bias the lower arm assemblies to forwardly extending positions in said vertical planes; each of said upper arm assemblies comprising a plurality of interconnected links defining scissor arms.

13. In a shelter according to claim 12, a rope for retracting the entire framework toward the doorway panels, said rope having opposite ends connected to the doorway panels and slidably engaging each of the lower arm assemblies, a plurality of spaced pulleys mountable on the doorway panels and cross member, said rope being entrained on the pulleys and having a free loop so that upon pulling downwardly on said loop the upper and lower arm assemblies retract simultaneously, and upon releasing said loop the top and bottom arm assemblies extend automatically.

14. In a shelter according to claim 13, a fabric cover attachable to the doorway panels and engaged with the cross member and outer ends of the arm assemblies, so that the cover retracts and expands with the arm assemblies.

References Cited by the Examiner
UNITED STATES PATENTS

| 1,021,330 | 3/12 | Price | 160—78 X |
| 2,567,995 | 9/51 | Eshnaur | 135—5 |
| 2,798,502 | 7/57 | D'Azzo | 135—5 |
| 2,840,091 | 6/58 | D'Azzo | 135—5 |
| 2,892,463 | 6/59 | Frommelt et al. | 135—5 |

HARRISON R. MOSELEY, *Primary Examiner.*